(12) United States Patent
Lake et al.

(10) Patent No.: US 7,113,191 B2
(45) Date of Patent: Sep. 26, 2006

(54) RENDERING A SILHOUETTE EDGE

(75) Inventors: Adam T. Lake, Beaverton, OR (US);
Carl S. Marshall, Portland, OR (US);
Michael Mesnier, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 09/996,451

(22) Filed: Nov. 28, 2001

(65) Prior Publication Data

US 2002/0075276 A1   Jun. 20, 2002

Related U.S. Application Data

(62) Division of application No. 09/427,380, filed on Oct. 25, 1999, now Pat. No. 6,822,658.

(51) Int. Cl.
*G06T 17/00* (2006.01)

(52) U.S. Cl. .................................................... 345/582

(58) Field of Classification Search ................ 345/423, 345/521, 418–422, 582–588, 552
See application file for complete search history.

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A * | 8/1989 | Robinson .................. 345/582 |
| 4,901,064 A | 2/1990 | Deering |
| 5,124,914 A | 6/1992 | Grangeat |
| 5,163,126 A | 11/1992 | Einkauf et al. |
| 5,371,778 A | 12/1994 | Yanof et al. |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,894,308 A | 4/1999 | Isaacs |
| 5,929,860 A | 7/1999 | Hoppe |
| 5,933,148 A | 8/1999 | Oka et al. |
| 5,949,969 A | 9/1999 | Suzuoki et al. |
| 5,966,133 A | 10/1999 | Hoppe |
| 5,966,134 A | 10/1999 | Arias |
| 5,974,423 A | 10/1999 | Margolin |
| 6,054,999 A | 4/2000 | Strandberg |
| 6,057,859 A | 5/2000 | Handelman et al. |
| 6,078,331 A | 6/2000 | Pulli et al. |
| 6,115,050 A | 9/2000 | Landau et al. |

(Continued)

OTHER PUBLICATIONS

Lewis "Pose Space Deformation: A Unified Approach to Shape Interpolation and Skeleton-Driven Deformation" Centropolis, New Orleans, LA, 165-172.

Lasseter "Principles of Traditional Animation Applied to 3D Computer Animation" Pixar, San Rafael, California, 1987.

Thomas (Contributor) et al., "The Illusion of Life: Disney Animation" 47-51.

(Continued)

*Primary Examiner*—Ulka Chauhan
*Assistant Examiner*—Peter-Anthony Pappas
(74) *Attorney, Agent, or Firm*—Fish & Richardson P.C.

(57) ABSTRACT

A silhouette edge is rendered in a display format that corresponds to a geometry of a three-dimensional model. An angle between the silhouette edge and an adjacent silhouette edge in the image is determined, and the display format for the silhouette edge is selected based on the angle. Texture mapping is used to generate the silhouette edge in the display format.

27 Claims, 10 Drawing Sheets

U.S. PATENT DOCUMENTS

| | | |
|---|---|---|
| 6,175,655 B1 | 1/2001 | George et al. |
| 6,191,787 B1 | 2/2001 | Lu et al. |
| 6,191,796 B1 | 2/2001 | Tarr |
| 6,198,486 B1 | 3/2001 | Junkins et al. |
| 6,201,549 B1 | 3/2001 | Bronskill |
| 6,208,347 B1 | 3/2001 | Migdal et al. |
| 6,219,070 B1 | 4/2001 | Baker et al. |
| 6,239,808 B1 | 5/2001 | Kirk et al. |
| 6,252,608 B1 | 6/2001 | Snyder et al. |
| 6,262,737 B1 | 7/2001 | Li et al. |
| 6,262,739 B1 | 7/2001 | Migdal et al. |
| 6,292,192 B1 | 9/2001 | Moreton |
| 6,317,125 B1 | 11/2001 | Persson |
| 6,337,880 B1 | 1/2002 | Cornog et al. |
| 6,388,670 B1 | 5/2002 | Naka et al. |
| 6,405,071 B1 | 6/2002 | Analoui |
| 6,437,782 B1 | 8/2002 | Pieragostini et al. |
| 6,478,680 B1 | 11/2002 | Yoshioka et al. |
| 6,559,848 B1 | 5/2003 | O'Rourke |
| 6,593,924 B1 | 7/2003 | Lake et al. |
| 6,593,927 B1 | 7/2003 | Horowitz et al. |
| 6,608,627 B1 | 8/2003 | Lake et al. |
| 6,608,628 B1 | 8/2003 | Ross et al. |
| 2001/0026278 A1 | 10/2001 | Arai et al. |
| 2002/0101421 A1 | 8/2002 | Pallister |

OTHER PUBLICATIONS

Hoppe, "Progressive Meshes" Microsoft Research, 99-108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27-36, 1998.

Taubin et al., "Progressive Forest Spilt Compression" IBM T.J. Watson Research Center, Yorktown Heights, NY.

Cohen-Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195-202.

Chow "Optimized Geometry Compression for Real-time Rendering" Massachusetts Institute of Technology, Proceedings Visualization 1997, Oct. 19-24, 1997, Phoenix, AZ, 347-354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applicatons, 29-37, 1995.

Raskar "Image Precision Silhouette Edges" University of North Carolina at Chapel Hill, Microsoft Research, 1999 Symposium on Interactive 3D Graphics Atlanta, GA, 135-231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison-Wesley Publishing Company, 1060-1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

Appel, Arthur, "The Notion of Quantitative Invisibility and the Machine Rendering of Solids." Proceedings of 22nd National Conference Association for Computing Machinery 1967.

Buck et al., "Performance-Driven Hand Drawn Animation", *ACM* (NPAR2000), pp. 101-108 (2000).

Catmull et al., "Recursively Generated B-Spline Surfaces on Arbitrary Topological Meshes," Computer Aided Design, 10(6):350-355 (1978).

Coelho et al., "An Algorithm for Intersecting and Trimming Parametric Meshes", *ACM* SIGGRAPH, pp. 1-8 (1998).

Deering, M., "Geometry Compression," *Computer Graphics*. SIGGRAPH '95, pp. 13-20, 1995.

DeRose et al., "Subdivisional Surfaces in Character Animation", *ACM*, SIGGRAPH'98, pp. 85-94 (1998).

Elber, Gershon, "Interactive Line Art Rendering of Freeform Surfaces", *Eurographics'99*, 18(3):C1-C12 (1999).

Gooch et al., "A Non-Photorealistic Lighting Model for Automatic Technical Illustration," *Computer Graphics Proceedings, Annual Conference Series, SIGGRAPH'98*, pp. 447-452 (1998).

Gooch et al., "Interactive Technical Illustration," *ACM Interactive 3D*, pp. 31-38 (1999).

Heidrich et al., "Realistic, Hardware-Accelerated Shading and Lighting," *ACM*, (SIGGRAPH'99), pp. 171-178 (1999).

Hoppe, H., "Progressive Meshes," URL: http://www.research.microsft.com/research/graphics/hoppe/, (10 pgs.).

Kumar et al., "Interactive Display of Large Scale NURBS Models", *ACM*, Symp. On Interactive 3D Graphics, pp. 51-58 (1995).

Lake et al., "Stylized Rendering Techniques for Scalable Real-Time 3D Animation", NPAR, pp. 101-108 (2000).

Lander, Jeff, "Making Kine More Flexible,"Game Developer Magazine, 5 pgs., Nov. 1998.

Lander, Jeff, "Skin Them Bones," Game Developer Magazine, 4 pgs., May 1998.

Pedersen, "A Framework for Interactive Texturing on Curved Surfaces", *ACM*, pp. 295-301 (1996).

"pmG Introduces Messiah: Animate 3.0", URL: http://www.digitalproducer.com/aHTM/Articles/july_2000/july_17_00/pmg_intros_messiah_animate.htm (Accessed Oct. 26, 2004) 2 pgs.

Pueyo, X. et al., "Rendering Techniques '96," Proc. of Eurographics Rendering Workshop 1996, EUROGRAPHICS, pp. 61-70 (1996).

Rockwood, A. et al., "Real-time Rendering of Trimmed Surfaces," Computer Graphics (SIGGRAPH '89 Proceedings) 23:107-116 (1989).

Sousa, M., et al., "Computer-Generated Graphite Pencil Rendering of 3-D Polygonal Models", Eurographics'99, 18(3):C195-C207 (1999).

Stam, J., "Exact Evaluation of Catmull-Clark Subdivision Surfaces at Arbitrary Parameter Values", SIGGRAPH 98 Conference Proceedings, Annual Conference Series, pp. 395-404 (1998).

Taubin et al., "3D Geometry Compression", SIGGRAPH'98 Course Notes (1998).

Wilhelms, J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448-01-spring/papers/wilhelms.pdf>.

\* cited by examiner

RENDERING A SILHOUETTE EDGE

This application is a divisional U.S. patent application Ser. No. 09/427,380 filed on Oct. 25, 1999 now U.S. Pat. No. 6,822,658 and entitled "Rendering A Silhouette Edge".

BACKGROUND OF THE INVENTION

This invention relates to rendering a silhouette edge of a three-dimensional ("3D") model.

Silhouette edges are outlines of a 3D model and its interior features. Silhouette edges are detected based on the intersection of front and back facing polygons that make up the 3D model. Computer programs are used to detect, and render, silhouette edges to form a two-dimensional ("2D") image from the 3D model. How those edges are rendered affects the look of the 2D image.

SUMMARY OF THE INVENTION

In general, in one aspect of the invention, silhouettes edges of a 3D model are detected and rendered in a format that corresponds to the geometry of the 3D model.

Among the advantages of the invention are one or more of the following. Rendering the silhouette edges in a format that corresponds to the geometry of the 3D model produces a 2D image that more closely approximates the 3D model. For example, curvature in the original 3D model can be detected, and curved silhouette edges can be selected to preserve the curvature of the original 3D model.

Other advantages and features will become apparent from the following description and the claims.

DESCRIPTION

Figure 1:
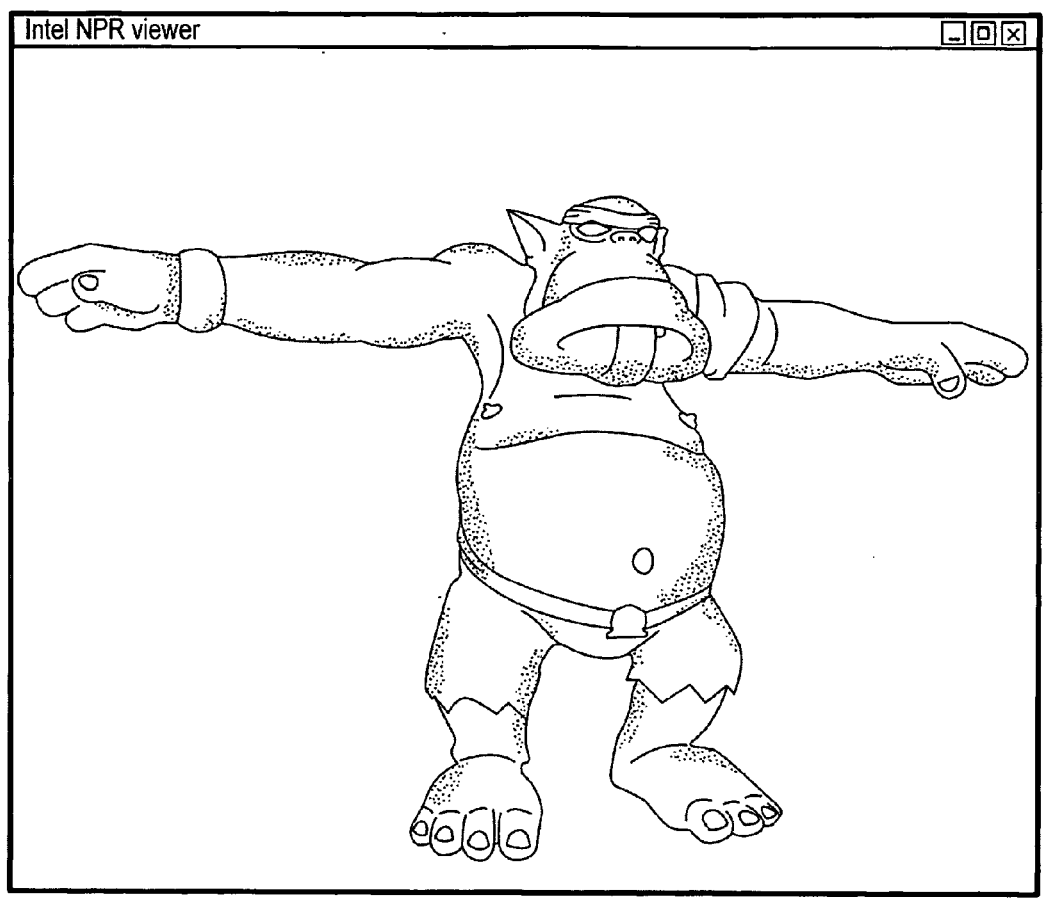
FIG. 1 is a view of a 3D model.
Figure 2:
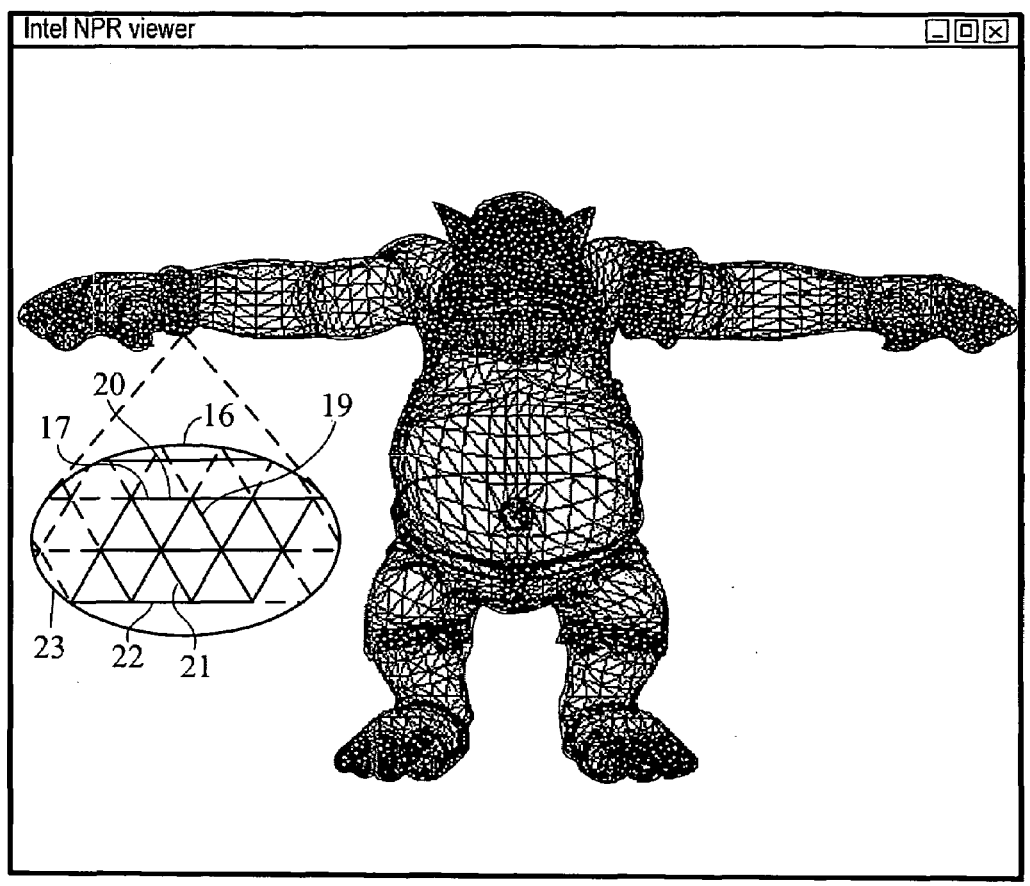
FIG. 2 is a view of polygons in the 3D model.
Figure 3:
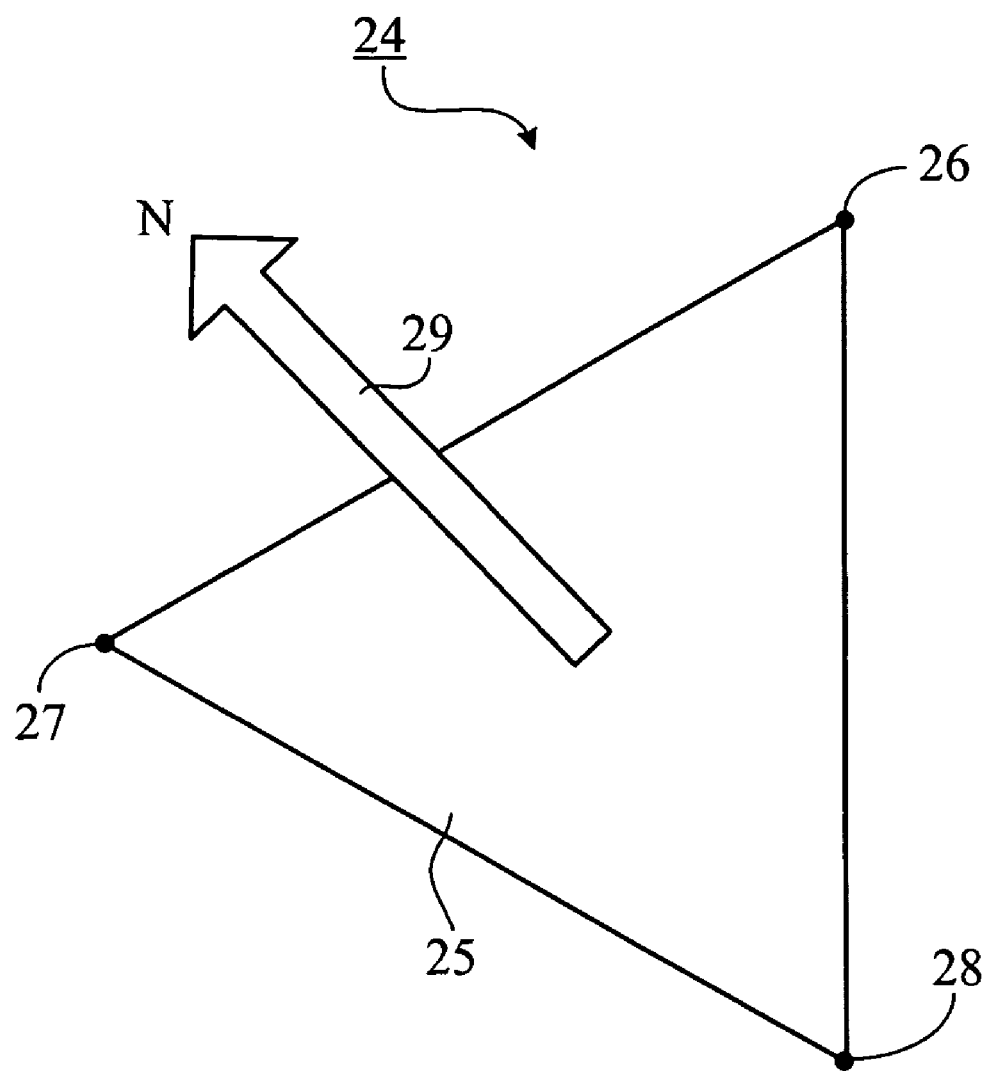
FIG. 3 is a view of one of the polygons.

As shown in FIGS. 1 and 2, 3D model 10 is comprised of interconnecting polygons 11. Polygons 11 are triangles in this embodiment; however, other types of polygons may be used. Groups of polygons are organized into meshes, each of which corresponds to an element of the 3D model. For example, arm band 14 and belt 15 are in different meshes. In a mesh, adjacent polygons share common features. For example, in arm band mesh 16, polygons 17 and 19 share a common edge 20 (see close-up view 23).

The 3D data for each triangular polygon is comprised of three vertices positioned in (x,y,z) coordinate space. These vertices define a face for each polygon in the image.

The 3D data also includes a vector to each face, which is also positioned in (x,y,z) coordinate space. For example, in FIG. 3, polygon 24 includes face 25, vertices 26 to 28, and vector ("N") 29.

Figure 4:
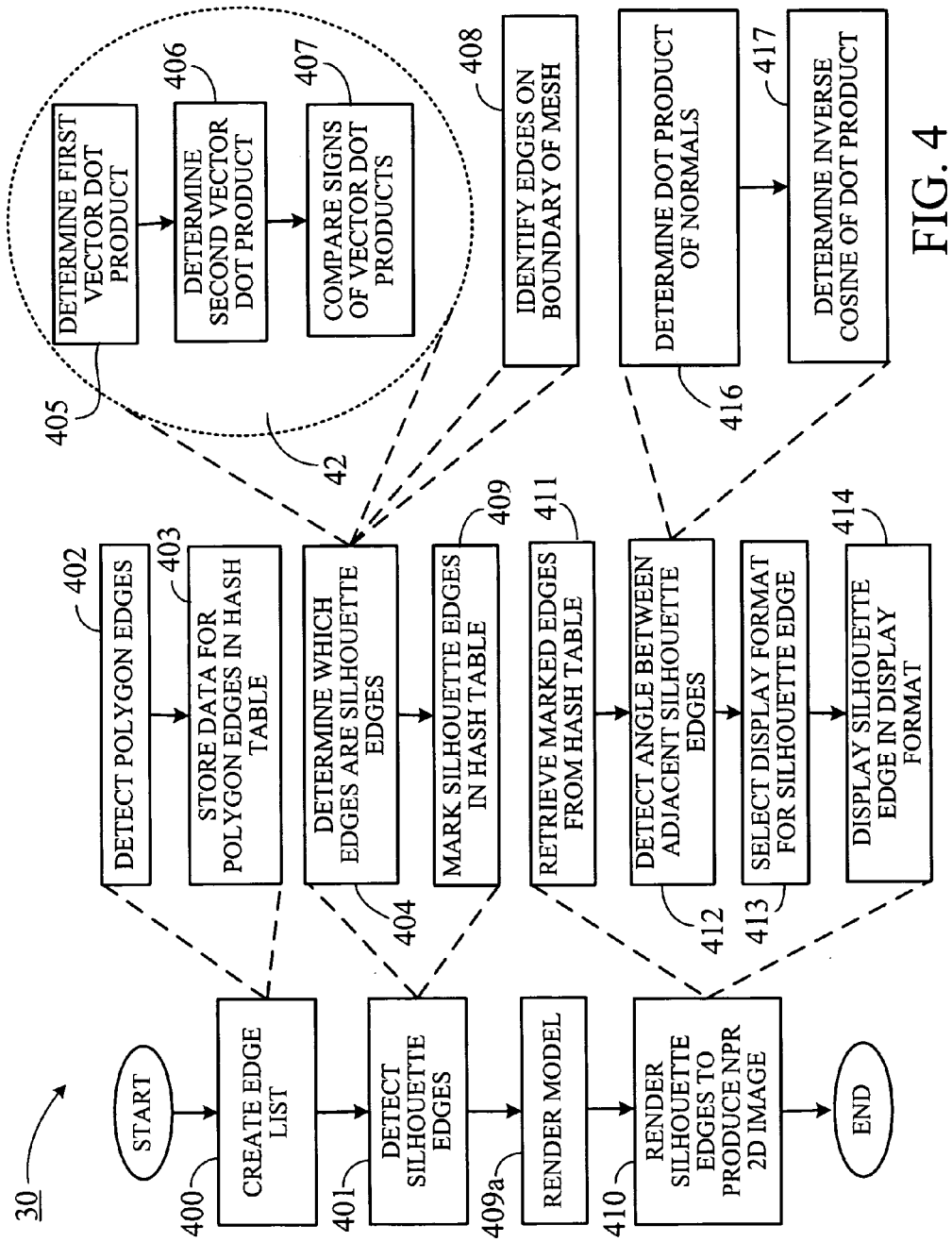
FIG. 4 is a flowchart showing a process for rendering a 2D image using silhouette edges in accordance with one embodiment of the invention.

This 3D data is used in process 30 of FIG. 4 for rendering non-photorealistic ("NPR") images (such as cartoon-like images) of 3D model 10 using silhouette edges.

Process 30 begins in 400 by creating an edge list from the 3D data. To do this, in 402, the face of a polygon in the 3D model is examined and the edge coordinates of the polygon are detected based on its vertices. In 403, the extracted edge coordinates are stored in an edge list in a hash table. The hash table includes entries that are accessible via keys stored in correspondence with the entries. Vertices of the edges are used to determine the keys for the hash table. The keys are determined by adding coordinates for the vertices of an edge, and dividing the resulting sum by the total size of the hash table. The remainder (or "Mod") of the resulting quotient is used as the key to access each edge in the hash table.

In 401, process 30 detects silhouette edges in the 3D data based on the edge list. In particular, process 30 determines, in 404, which edges in the hash table are silhouette edges. Two types of silhouette edges are detected by process 30. One type of silhouette edge is a common edge shared by two polygon faces—a front face and a back face. This type of silhouette edge defines a transition point between front and back features of an image relative to a preset point (the "eyepoint") on a display screen. An eyepoint vector is used to determine whether a polygon face is front-facing or back facing.

The eyepoint vector is the vector from the preset point to the face of a target polygon. An eyepoint vector 36 (pointing out of the page) and a vector 37 are shown in FIG. 1.

Figure 5:
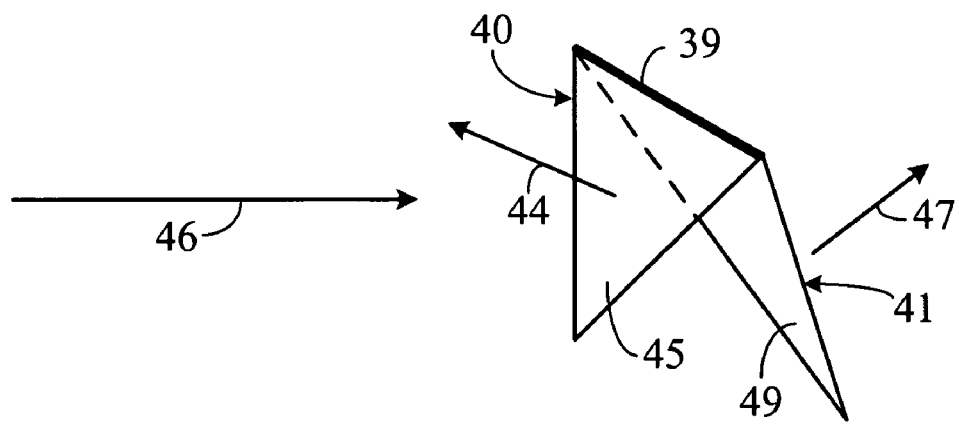
FIG. 5 is a perspective view of polygons which illustrates how silhouette edges are detected.

To determine whether an edge 39 shared by two polygons 40 and 41 (FIG. 5) is a silhouette edge, process 30 executes the steps of block 42.

In 405, process 30 determines the vector dot product of vector 44 (to polygon face 45) and eyepoint vector 46. In 406, process 30 determines the vector dot product of vector 47 (to polygon face 49) and eyepoint vector 46.

The signs of the resulting dot products are then compared in 407. If the signs are the same, this means that each of polygon faces 45 and 49 can be viewed from the eyepoint on the screen (or they are both back-facing). If this were the case, edge 39 would not be a silhouette edge. If the signs are different, the two polygon faces 45 and 49 are facing in different directions, meaning that one of the polygon faces cannot be viewed from the eyepoint. This is the case in FIG. 5; therefore, edge 39 is a silhouette edge.

Figure 6:
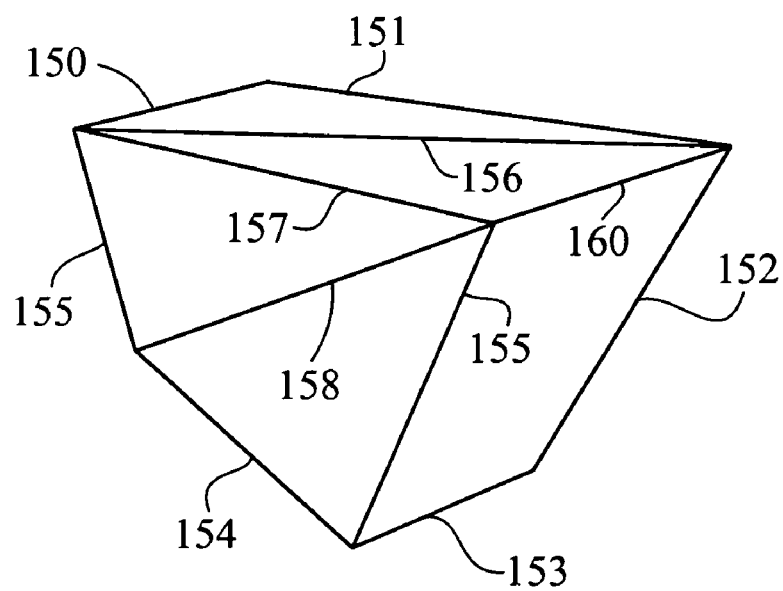
FIG. 6 is a view of adjacent polygons.

As shown in FIG. 6, edges 150, 151, 152, 153, 154 and 155 of image 48 are silhouette edges since they are shared with polygons that cannot be seen from the eyepoint (for example, 90° to the page showing FIG. 6). Edges 156, 157, 158, 159 and 160 are not silhouette edges since they are shared by polygons that can be seen from the eyepoint.

Another type of silhouette edge is found on a boundary of a mesh. This type of silhouette edge is not shared with an adjacent polygon. For example, in FIGS. 1 and 2, polygons on the perimeter of arm band 14 (such as polygon 21) contain at least one edge (edge 22) that is not shared with an adjacent polygon in the same mesh (though such an edge may abut a polygon of another mesh). To detect this type of silhouette edge, in 408, process 30 detects edges in a mesh that are not shared with an adjacent polygon in the same mesh. Detecting can be performed by comparing vertices of polygon edges to determine if the same vertices are used in two different polygons.

Once a silhouette edge has been detected, in 409 it is marked in the hash table containing the list of all edges. This may be done after each silhouette edge is detected, or all silhouette edges in an image may be detected and then marked. The silhouette edges are marked with a boolean flag; however, other markings may be used. In 409a, process 30 renders the 3D model.

In 410, process 30 renders an NPR 2D image from the silhouette edges marked in the hash table. The marked silhouette edges are retrieved from the hash table in 411 and rendered in 412 to 414 in a format that corresponds to the geometry of the original 3D model. What is meant by "geometry" is the curvature, texture, contours or other physical features of the 3D model. Rather than rendering all individual edges (or edge portions) as straight lines, the geometry of the 3D model is used to determine the display format of the individual edges. For example, if the geometry of the 3D model includes a curve, then a curved line is used in the silhouette edge rendering process.

Figure 7:
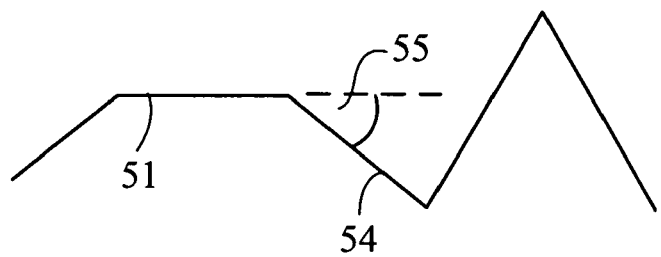
FIG. 7 is a view of silhouette edges.

One way of determining the geometry of the 3D model is to determine the angle between adjacent silhouette edges. In 412, process 30 detects this angle based on a silhouette edge 51 and its adjacent silhouette edge 54 (FIG. 7). Process 30 determines the dot product of edges 51 and 54 in 416. This dot product is the cosine of angle 55 between silhouette edges 51 and 54. To determine this angle, in 417 process 30 determines the inverse cosine of the dot product.

Figure 8A:
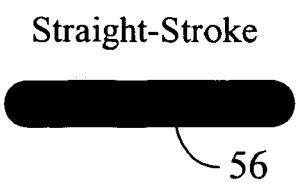
FIGS. 8a, 8b and 8c are texture maps for rendering the silhouette edges.
Figure 8B:
Figure 8C:

Once the angle between adjacent silhouette edges has been determined, process 30 selects (in 413) a display format for the target silhouette edge based on the angle. In this embodiment, the display format is a texture map; however, other display formats may be used. In a simple example, one of the texture maps shown in FIGS. 8a, 8b and 8c may be selected. FIG. 8a shows a straight-stroke texture map 56 for generating straight silhouette edges. FIGS. 8b and 8c show respective leftward-stroke 57 and rightward-stroke 59 texture maps for generating curved silhouette edges. Which of these texture maps is selected by process 30 in 413 depends upon the angle determined in 412.

Straight-stroke texture map 56 is selected in 413 if an absolute value of the angle determined in 412 is less than a predetermined value, such as 10°. Other values, however, may be used. If the absolute value of the angle is greater than 10° and the angle is positive (for example), leftward-stroke texture map 57 is selected in 413. If the absolute value of the angle is greater than 10° and the angle is negative (for example), rightward-stroke texture map 59 is selected in 413.

Figure 9:
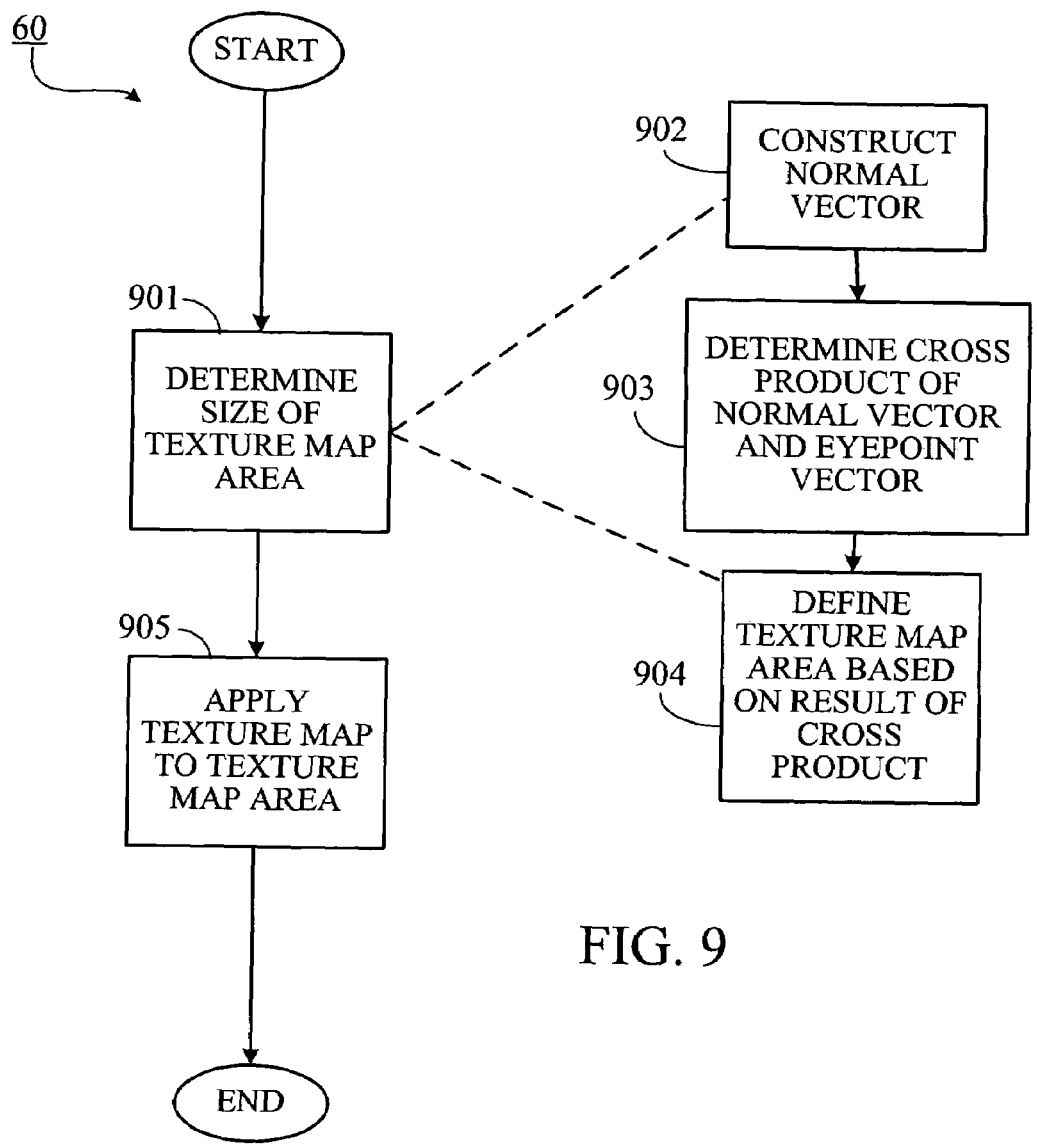
FIG. 9 is a flowchart showing a texture mapping process in accordance with one embodiment of the invention.

In 414, process 30 displays the silhouette edge using the selected texture map. FIG. 9 shows a process 60 for rendering the silhouette edge using texture mapping. In 901, process 60 determines a size of an area into which the texture map is to be rendered (the "texture map area"). The texture map area is a quadrilateral, such as a rectangle, having a width that is orthogonal to its height and to the eyepoint vector. The texture map area is configured this way so that all texture maps face the eyepoint and thus can be viewed from the same perspective.

Figure 10:
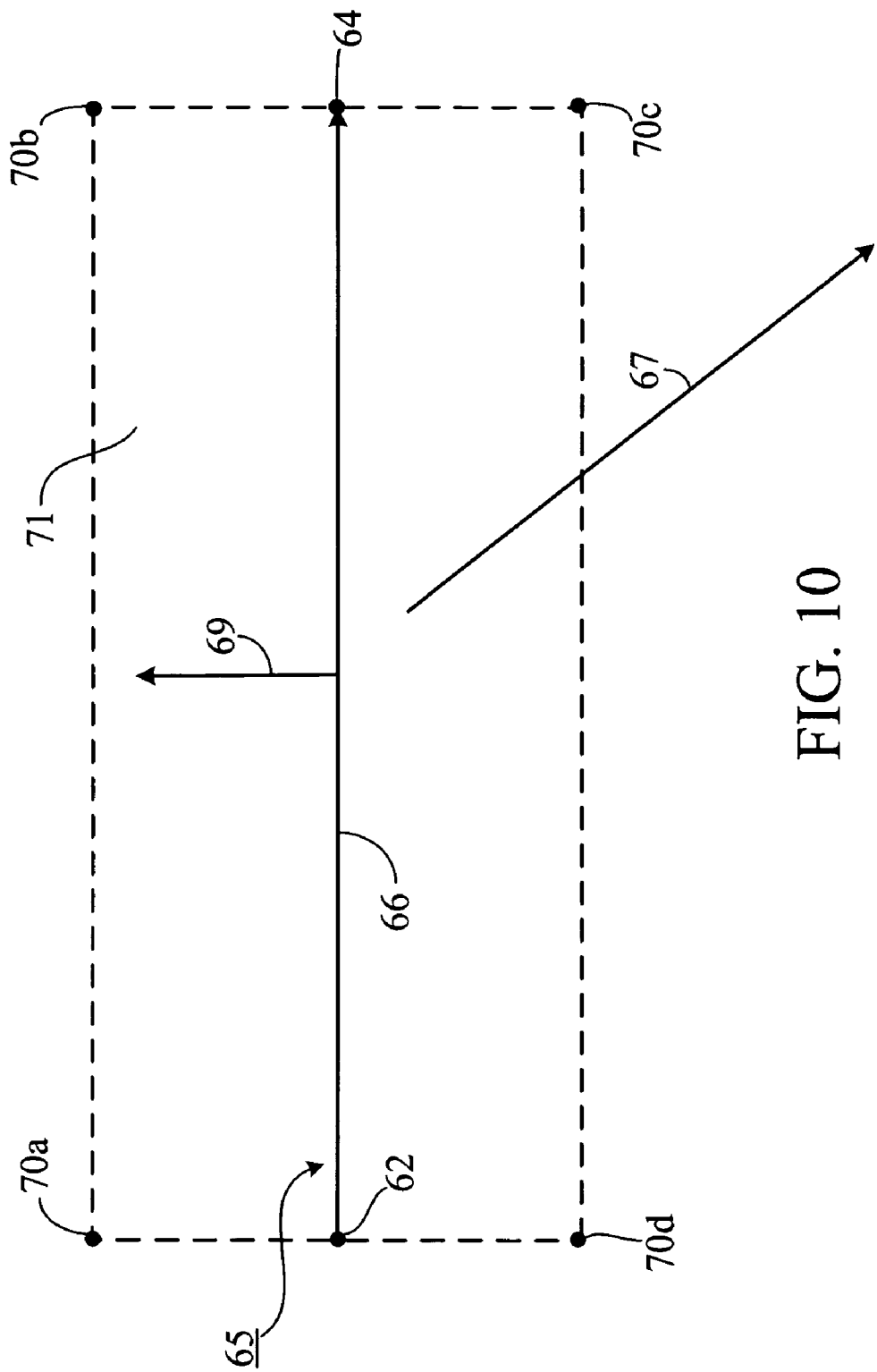
FIG. 10 shows a texture map area.

To determine the size of the texture map area, in 902 process 60 constructs a vector relative to a silhouette edge, in this example, between two end points 62 and 64 of silhouette edge 65 (see FIG. 10). Vector 66 defines the height of the texture map area. In 903, process 60 determines the cross product of vector 66 and an eyepoint vector 67. This cross product produces a width vector 69, which defines the direction of the width of the texture map area. The width vector is orthogonal to both vector (height) 66 and eyepoint vector 67.

In 904, process 60 defines the texture map area based on four map points that are positioned relative to end points 62 and 64 in a direction of width vector 69. The four map points 70a to 70d are positioned so that one map point is on each side of, and equidistant from, each end point (see FIG. 10). The distance between each map point and a corresponding end point determines the size of texture map area 71. This size may be pre-set, or it may be controlled by a computer animator via a graphical user interface (not shown). The size is not necessarily dictated by the magnitude of width vector 69.

Once the texture map area is defined for each silhouette edge, the texture map selected for that area in 413 (of process 30) is applied in 905. Display of the silhouette edges using texture mapping may be performed for each silhouette edge immediately after a texture map is selected for that edge. Alternatively, texture maps may be selected for all of the silhouette edges of an image (or some subset of silhouette edges, such as a mesh), and then texture mapping may be performed.

Figure 11A:
FIG. 11a shows a 2D image rendered with all straight silhouette edges.
Figure 11B:
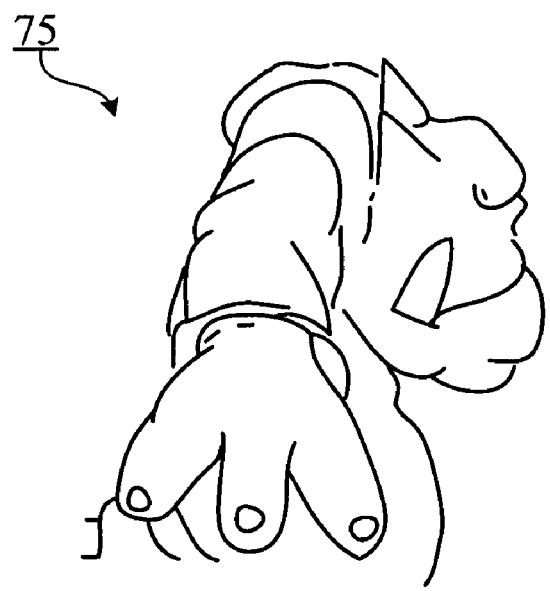
FIG. 11b shows the same 2D image rendered with texture-mapped silhouette edges.

FIGS. 11a and 11b show how processes 30 and 60 affect the look of a 2D NPR image. Image 74 in FIG. 11a is an NPR image that was rendered using all straight lines for the silhouette edges. Image 75 in FIG. 11b is an NPR image that was rendered using processes 30 and 60 and texture maps 56, 57 and 59 (FIGS. 8a to 8c). Comparing the two images 74 and 75, it is clear that the lines in image 75 are relatively fluid, and resemble a cartoonist's sketch more so than those in image 74.

Processes 30 and 60 may be used to create animation cels for cartooning. For example, a 3D model, such as model 10, may be generated, and then positioned in a desired manner. Processes 30 and 60 may be executed on the model to produce an NPR 2D image for that position. Then, the 3D model 10 can be re-positioned (e.g., rotated), and processes 30 and 60 executed on the re-positioned model to produce an NPR 2D image for the new position. This process may be repeated to produce NPR 2D images for any number of positions. In this way, processes 30 and 60 can generate animation cels automatically.

Processes 30 and 60 are performed in 3D space, meaning that they are performed using 3D data. By processing data in 3D space (as opposed to 2D space), processes 30 and 60 can be performed using a processor and rendering can be done using graphics accelerator cards of a personal computer.

Figure 12:
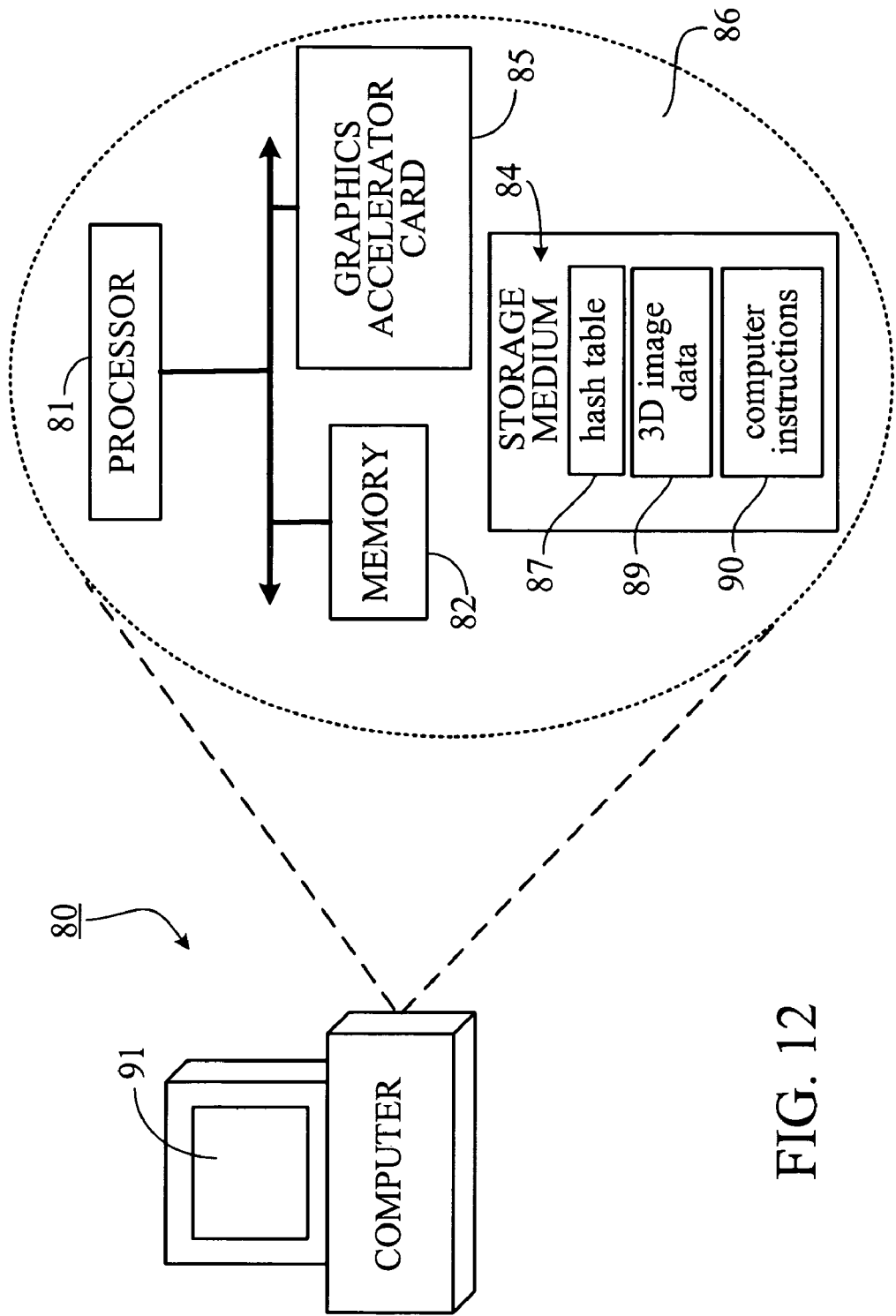
FIG. 12 is a view of a computer system on which the processes of FIGS. 4 and 9 may be implemented.

FIG. 12 shows a computer 80 for rendering NPR images using processes 30 and 60. Computer 80 includes a processor 81, a memory 82, a storage medium 84 (e.g., a hard disk), and a 3D graphics accelerator card 85 for repositioning a 3D model and manipulating 3D data (see view 86). Storage medium 84 stores hash table 87 containing the edge list described above, 3D data 89, and computer instructions 90 for rendering NPR 2D images via processes 30 and 60.

Processes 30 and 60, however, are not limited to use with any particular hardware or software configuration; they may find applicability in any computing or processing environment. Processes 30 and 60 may be implemented in hardware, software, or a combination of the two. Processes 30 and 60 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 30 and 60 and to generate output information. The output information may be applied to one or more output devices, such as display screen 91.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 30 and 60. Processes 30 and 60 may also be implemented as a computer-readable storage medium, configured with a computer program, where, upon execution, instructions in the computer program cause the computer to operate in accordance with processes 30 and 60.

Other embodiments are also within the scope of the following claims. For example, methods of detecting silhouette edges other than that described above in process 30 may be used during the NPR image rendering process.

The invention is not limited to the texture maps shown in FIGS. 8a, 8b and 8c. Other types (e.g., shapes) and styles of texture maps may be used. For example, the texture maps shown in FIGS. 8a, 8b and 8c may be implemented in brush-style, pencil-style, or crayon-style. Alternatively, a single texture map may be used to render all silhouette edges of a 3D model. For example, a charcoal-style silhouette edge could be used to give the resulting image a "sketchy" feel. In cases where a single texture map is used, there is no need to determine the angle between adjacent silhouette edges.

Other criteria for determining which texture maps to use to render a silhouette edge (meaning other than an angle between two adjacent silhouette edges) may also be employed, depending upon the geometry of the original 3D model and the complexity of the texture maps being used.

The invention claimed is:

1. A method of applying a texture map to render a silhouette edge, comprising:
   determining texture map area based on an eyepoint vector to the silhouette edge, the texture map area having a width and a height, the texture map area being determined so that the width is orthogonal to the eyepoint vector and to the height; and
   applying a texture map to the texture map area to render the silhouette edge;
   wherein determining a texture map area comprises:
   (i) constructing a vector relative to the silhouette edge;
   (ii) determining a cross product of the vector and the eyepoint vector to determine a direction of the width of the texture map area; and
   (iii) defining the texture map area based on points that are positioned relative to end points of the silhouette edge along the direction of the width.

2. The method of claim 1, wherein the texture map area is a quadrilateral.

3. The method of claim 1, further comprising:
   detecting the silhouette edge;
   wherein the silhouette edge is rendered in a display format that corresponds to a geometry of a three-dimensional model.

4. The method of claim 3, wherein rendering comprises:
   determining an angle between the silhouette edge and an adjacent silhouette edge; and
   selecting the display format for the silhouette edge based on the angle.

5. The method of claim 4, further comprising displaying the silhouette edge in the display format.

6. The method of claim 5, wherein the display format comprises the texture map.

7. The method of claim 4, wherein the angle is determined based on the silhouette edge and the adjacent silhouette edge.

8. The method of claim 4, wherein determining comprises:
   determining a dot product of the silhouette edge and the adjacent silhouette edge; and
   determining an inverse cosine of the dot product to obtain the angle.

9. The method of claim 4, wherein a first display format is selected if an absolute value of the angle is less than a value, a second display format is selected if the absolute value of the angle is greater than the value and the angle is positive, and a third display format is selected if the absolute value of the angle is greater than the value and the angle is negative.

10. An article comprising a machine-readable medium that stores machine-executable instructions for applying a texture map to render a silhouette edge, the instructions for causing a machine to:
    determine a texture map area based on an eyepoint vector to the silhouette edge, the texture map area having a width and a height, the texture map area being determined so that the width is orthogonal to the eyepoint vector and to the height; and
    apply a texture map to the texture map area to render the silhouette edge;
    wherein determining a texture map area comprises:
    (i) constructing a vector relative to the silhouette edge;
    (ii) determining a cross product of the vector and the eyepoint vector to determine a direction of the width of the texture map area; and
    (iii) defining the texture map area based on points that are positioned relative to end points of the silhouette edge alone the direction of the width.

11. The article of claim 10, wherein the texture map area is a quadrilateral.

12. The article of claim 10, further comprising instructions that cause the machine to:
    detect the silhouette edge;
    wherein the silhouette edge is rendered in a display format that corresponds to a geometry of a three-dimensional model.

13. The article of claim 12, wherein rendering comprises:
    determining an angle between the silhouette edge and an adjacent silhouette edge; and
    selecting the display format for the silhouette edge based on the angle.

14. The article of claim 13, further comprising instructions that cause the machine to display the silhouette edge in the display format.

15. The article of claim 14, wherein the display format comprises the texture map.

16. The article of claim 13, wherein the angle is determined based on the silhouette edge and the adjacent silhouette edge.

17. The article of claim 13, wherein determining comprises:
   determining a dot product of the silhouette edge and the adjacent silhouette edge; and
   determining an inverse cosine of the dot product to obtain the angle.

18. The article of claim 13, wherein a first display format is selected if an absolute value of the angle is less than a value, a second display format is selected if the absolute value of the angle is greater than the value and the angle is positive, and a third display format is selected if the absolute value of the angle is greater than the value and the angle is negative.

19. An apparatus for applying a texture map to render a silhouette edge, comprising:
   a memory which stores computer instructions; and
   a processor which executes the computer instructions to
   (i) determine a texture map area based on an eyepoint vector to the silhouette edge, the texture map area having a width and a height, the texture map area being determined so that the width is orthogonal to the eyepoint vector and to the height, and
   (ii) to apply a texture map to the texture map area to render the silhouette edge;
   wherein determining a texture map area comprises:
      constructing a vector relative to the silhouette edge;
      determining a cross product of the vector and the eyepoint vector to determine a direction of the width of the texture map area;
      defining the texture map area based on points that are positioned relative to end points of the silhouette edge along the direction of the width.

20. The apparatus of claim 19, wherein the texture map area is a quadrilateral.

21. The apparatus of claim 19, wherein the processor executes instructions to:
   detect the silhouette edge;
   wherein the silhouette edge is rendered in a display format that corresponds to a geometry of a three-dimensional model.

22. The apparatus of claim 21, wherein rendering comprises:
   determining an angle between the silhouette edge and an adjacent silhouette edge; and
   selecting the display format for the silhouette edge based on the angle.

23. The apparatus of claim 22, further comprising displaying the silhouette edge in the display format.

24. The apparatus of claim 23, wherein the display format comprises the texture map.

25. The apparatus of claim 22, wherein the angle is determined based on the silhouette edge and the adjacent silhouette edge.

26. The apparatus of claim 22, wherein determining comprises:
   determining a dot product of the silhouette edge and the adjacent silhouette edge; and
   determining an inverse cosine of the dot product to obtain the angle.

27. The apparatus of claim 22, wherein a first display format is selected if an absolute value of the angle is less than a value, a second display format is selected if the absolute value of the angle is greater than the value and the angle is positive, and a third display format is selected if the absolute value of the angle is greater than the value and the angle is negative.

* * * * *